July 6, 1954
A. GRANGE
2,682,999
LOCKING SYSTEM FOR EXPOSURE-METERING AND
FILM-WINDING MEANS IN CAMERAS
Filed Jan. 18, 1952
2 Sheets-Sheet 1
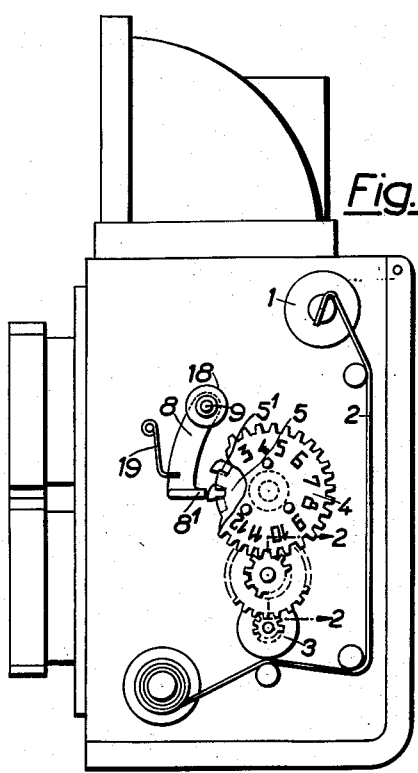
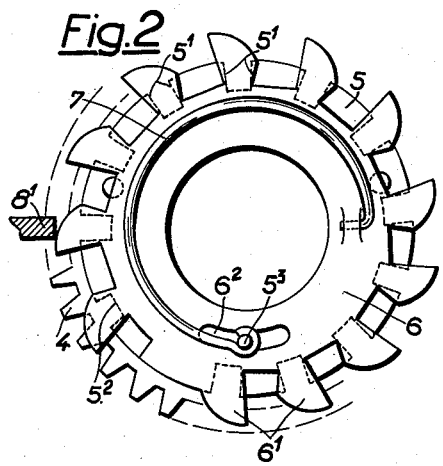
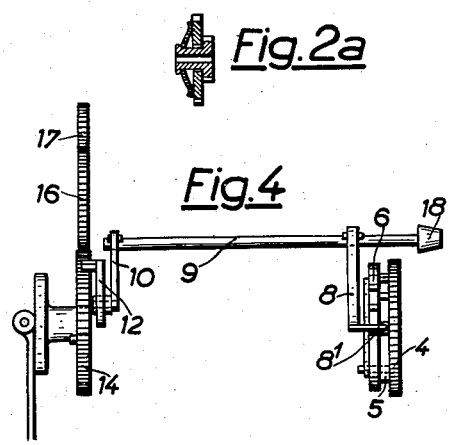
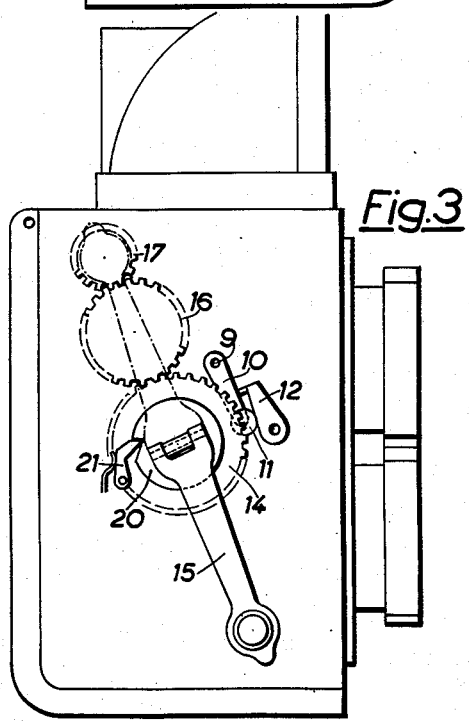
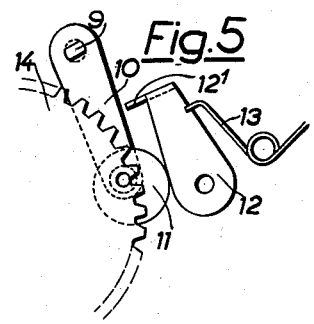
Inventor:
ANDRÉ GRANGE
by: J. Delattre-Seguy
Attorney July 6, 1954

A. GRANGE 2,682,999

LOCKING SYSTEM FOR EXPOSURE-METERING AND
FILM-WINDING MEANS IN CAMERAS

Filed Jan. 18, 1952

Inventor:
ANDRÉ GRANGE
by: Matter-Seguy
Attorney

Patented July 6, 1954

2,682,999

UNITED STATES PATENT OFFICE 2,682,999

LOCKING SYSTEM FOR EXPOSURE-METERING AND FILM-WINDING MEANS IN CAMERAS

André Grange, Saint-Etienne, France

Application January 18, 1952, Serial No. 267,047

Claims priority, application France
January 23, 1951

9 Claims. (Cl. 242—71)

My invention has for its object a locking system adapted to cut out any errors in the positioning and in the exposure of each picture area of a photographic film inside a camera in order to prevent the objectionable results of negligence or faulty handling by the operator. Furthermore, my improved arrangement is advantageously distributed into two groups of parts that may each be positioned before the final mounting on a carrier plate after which it is possible to provide in a simple and speedy manner for the mounting of the two groups of parts on the camera box.

According to my invention, there is provided a knob-controlled spindle carrying at each end a lever adapted to control respectively the locking of the exposure-metering means and that of the film-winding means each time the film has one of its picture areas in operative position for view-taking, the release being provided after each view-taking through actuation of the knob to shift the spindle into a predetermined angular position.

My invention will be readily ascertained through the reading of the following description, reference being made to accompanying drawings, wherein:

Fig. 1 is a general view associated with the diagrammatic outline of a camera, of the parts of the system ensuring a locking of the exposure-metering means, said parts of the arrangement being adapted to provide also for the locking of the film-winding mechanism.

Fig. 2 illustrates on a larger scale certain parts of the system that provide for the locking of the metering means and of the film-winding mechanism.

Fig. 2a is a sectional side view through line 2—2 of Fig. 1 of the friction means inserted between two toothed members of the exposure meter.

Fig. 3 is a general view, associated with a diagrammatic outline of a camera, of the parts of the system actually producing the locking of the film winding mechanism.

Fig. 4 illustrates diagrammatically, in front view, the general arrangement and interconnection of the different parts of the system.

Fig. 5 shows, on a larger scale, the parts of the arrangement that produce the locking of the film-winding mechanism.

The system includes the same parts as the exposure-metering means disclosed in my copending specification entitled "Exposure-Metering Device," with the difference however, that, in the present application, the indicator wheel of the meter is always driven in the same direction.

Figure 6:
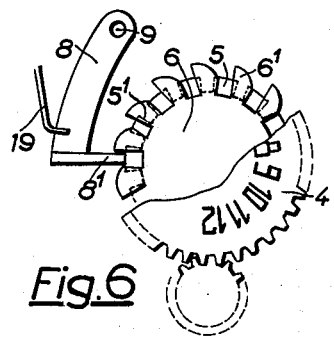
Figs. 6 and 7 illustrate the corresponding positions of the different parts of the device during the positioning of the film when a picture area is about to be exposed.
Figure 7:
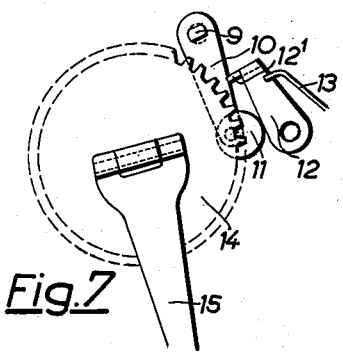

Said meter is controlled by the winding of the film 2 over its reel or spool 1; the film is urged through frictionally operating elastic means against a roller 3 operatively connected through a pinion and an intermediary speed-reducing gear with the indicator wheel 4. Numerals or reference marks are engraved or otherwise affixed to the side of the wheel 4 and appear each in its turn in register with an inspection gate so as to show, at any moment, the number of the picture area on the film that is in its operative view-taking position.

Now, in accordance with the present invention, two discs 5 and 6, are carried by the spindle of the indicator wheel 4 (Figs. 1 and 2). The disc 5 is provided at its periphery with a plurality of notches $5^1$ and with a notch $5^2$, the total number of the notches corresponding to the number of references to picture areas carried by the indicator wheel 4; thus, twelve notches correspond to the twelve picture areas of a film carrying twelve views, as in the case illustrated. The notch $5^2$ is much less deep than said notches $5^1$ and is located beyond the last notch $5^1$. The disc 5 is directly secured through screws or the like means to the indicator wheel 4.

The disc 6 is similarly provided along a peripheral line registering with the notches $5^1$ with shaped abutments $6^1$, the number and position of which correspond to the different notches $5^1$ and $5^2$ of the disc 5. However, the disc 6 is connected with the disc 5 and consequently with the wheel 4 through an elastic member constituted by the spring 7 secured on one hand to the disc 6 while its other end is secured to the projection $5^3$ on the disc 5. Consequently, the disc 6 is adapted to be shifted angularly with reference to the disc 5 and to the indicator wheel 4 and, to this end, an arcuate opening $6^2$ forming a guide is provided in the disc 6.

A lever 8 carrying at one end a lug $8^1$ adapted to engage the notches and abutments provided on the discs 5 and 6 is pivotally secured at its other end to a transverse spindle 9 revolubly carried in suitable partitions or carriers associated with the camera box.

On the side of the camera opposed to the metering means, is provided a lever 10 keyed to the same spindle 9 through one end as illustrated in Figs. 3, 4 and 5, and it carries at its other end an adjustable stop constituted by a part 11 eccentrically secured to said lever 10 and engaged by the locking lever 12 submitted to the action of spring means such as the spring illustrated at 13 in Fig. 5.

The locking lever 12 is provided with a nose $12^1$ adapted to engage the teeth on the wheel 14. The latter rotates in unison with hand-operated driving means such as the crank 15. The wheel 14 drives through the agency of the pinion 16 a pinion 17 coupled through any known or suitable means with the film taking-up reel 1.

The spindle 9 connecting the two groups of parts of my improved system extends up to the outside of the camera and ends with a control knob 18 (Figs. 1 and 2). This knob allows releasing the lug $8^1$ of the lever 8 with reference to the notches of the disc 5 when it is desired to position a further picture area on the film. A spring system illustrated at 19, acts on the lever 8 as shown in Fig. 1 so as to urge the lug $8^1$ into the notches of the disc 5, when registering therewith.

To the spindle carrying the wheel 14 and crank 15 is secured a disc 20 provided with a notch, as shown in Fig. 3, for engagement by a catch 21 urged by a spring system into said notch. Said catch has for its object, when the crank 15 is to be brought from its operative film-winding position into its inoperative position drawn in dot-and-dash lines in Fig. 3, to hold said crank in the desired angular position. The operation of the arrangement is as follows: once the film reel has been positioned and the camera has been closed, the lug $8^1$ on the lever 8 engages the notch $5^2$ as it does at the end of the winding of the preceding film reel. The nose $12^1$ being disengaged with reference to the teeth on the wheel 14, it is possible to wind the film through the crank 15. The roller 3 of the meter is driven by the film as it unwinds, although the indicator wheel 4 remains locked through the friction means constituted, as illustrated by way of example in Fig. 2a of the drawings, by a spring blade inserted under tensioned conditions between a pinion and a toothed wheel of the intermediary speed reducing gear connecting the roller 3 with the wheel 4.

The first view is positioned through the appearance of the corresponding mark on the film in register with the sighting aperture in the camera box and this operation provides for correspondence between the film and the numeral 1 on the indicator wheel corresponding to the notch $5^2$ having a reduced depth, said wheel being still locked as disclosed.

When the first view has been taken, the lug $8^1$ is released with reference to the notch $5^2$ through operation of the knob 18, and the disc 6 that is urged back angularly by the spring 7, covers through its abutments $6^1$ the notches $5^1$ of the disc 5.

Figure 8:
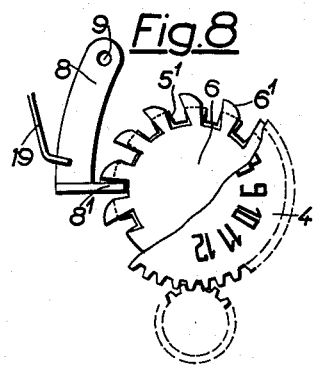
Figs. 8 and 9 show the corresponding positions of the parts of the system at the moment of the locking of the film in a position ready for exposure.
Figure 9:
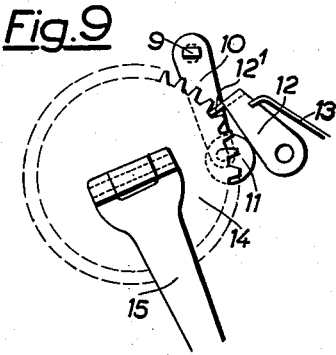

The lug $8^1$ on the lever is allowed to return into engagement on the disc 6 so that when winding the film the lug $8^1$ slides over the first abutment $6^1$ carried by the disc 6 and then onto a solid portion of the disc 5 until said lug $8^1$ comes into contact with the next stop $6^1$ covering the first notch $5^1$. This prevents further rotation of the disc 6 while the drive of the wheel 4 and of the disc 5 continues until the moment at which the first notch $5^1$ is completely uncovered and the lug $8^1$ engages it, while the accompanying pivotal motion of the lever 8 produces through the spindle 9 a corresponding movement of the lever 10 so as to lower the lever 12 the nose $12^1$ on which locks the wheel 14 and prevents the film from being wound. The first picture area is then in its view-taking position and this shifting of the levers associated with a locking of the winding and metering means on either side of the camera is performed again for each picture area through engagement of the lug $8^1$ in the successive notches $5^1$ (Figs. 8 and 9).

When it is desired to shift the film from one picture area to the next, it is sufficient to shift through the knob 18 the spindle 9 and the lever 8 in antagonism with the spring 19 so as to release the lug $8^1$ with reference to the notch $5^1$ engaged thereby. The disc 6 returns automatically into its original position under the action of the spring 7 and the shaped stops $6^1$ again cover the notches of the disc 5 and hold the lug $8^1$ fast, as illustrated in Figs. 1 and 2. The lever 12 and its nose $12^1$ being thus released with reference to the wheel 14, it is possible to continue winding the film through the crank 15 for exposing the next picture area.

Figure 10:
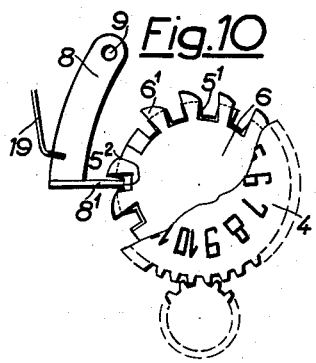
Figs. 10 and 11 illustrate corresponding positions of the different parts of the system at the end of the exposure of the last picture area on the film in order to provide for the final winding of the latter and subsequently for rewinding the beginning of the following film.
Figure 11:
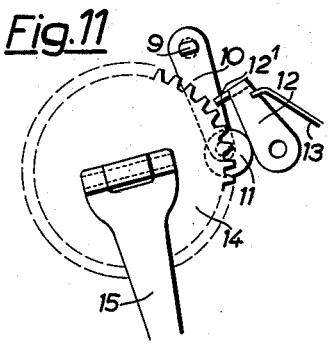

When the last picture on the film has been exposed and the winding of the film is resumed, the lug $8^1$ reengages the final notch $5^2$ of a reduced depth. Consequently, the pivotal movement of the lever 8 is reduced in amplitude as well as that of the lever 10 so that the lever 12 cannot move to an extent such that its nose may lock the wheel 14 and it is, therefore, possible to finish the free winding of the film (see Figs. 10 and 11). The friction-operated means of Fig. 2a allows this final winding without the wheel 4 being actuated.

The grouping of the parts of the arrangement is thus made apparent, to wit: those relating to the metering means and including the discs 5 and 6 and the lever 8 on one side and those relating to the film winding mechanism on the other side of the camera, the latter parts including the crank 15 driving the pinions 16 and 17 and the wheel 14 and the locking members 10, 11, 12 for said mechanism while the spindle 9 forms the operative connection between these two groups or parts. This arrangement allows mounting separately the groups or parts on corresponding carrier plates that are thenafter secured to the box or casing of the camera. This allows a much more speedy and easy mounting, checking and repair of the camera.

Obviously, and as already apparent from the preceding disclosure, my invention is by no means limited to the embodiments and applications described nor to the particular design described for the different parts thereof, and it covers all the modifications thereof falling within the scope of accompanying claims.

What I claim is:

1. In a photographic camera, the combination of film-winding means, exposure-metering means, a rotatable spindle, a lever rigidly carried at each end of said spindle, a locking system for the exposure-metering means and a locking system for the film-winding means forming independent units in register with each of said levers, elastic means urging the levers into operative connection with the corresponding locking system for predetermined positions of the film during its unwinding, and an outer control knob rigidly connected with the spindle, the rotation of said knob in one direction actuating said spindle and levers to disengage both said levers from their corresponding locking systems.

2. In a photographic camera, the combination of film-winding means, exposure-metering means including a friction wheel engaging the film, a speed-reducing gear controlled thereby, an indicator wheel controlled by the speed-reducing gear carrying the successive numbers of the picture areas to make said numbers appear to view for the successive view-taking positions of the film in the camera, a disc rigid with said indicator wheel provided with a plurality of radial peripheral notches corresponding to the numbers on the indicator wheel, a rotatable spindle, a lever rigidly carried at each end of said spindle one of said levers engaging selectively the notches in the disc of the metering means, as they pass in front of it, locking means for the film-winding means controlled by the other lever each time the first lever operatively engages one of the notches in the disc of the metering means and an outer control knob rigidly connected with the spindle, the rotation of said knob in one direction actuating said spindle and levers to disengage said levers from their corresponding locking means.

3. In a photographic camera, the combination of film-winding means, including a film-winding crank, a film-winding gear controlled by said crank and including a pinion, exposure metering means, a rotatable spindle, levers rigidly carried at each end of said spindle, a locking lever including a nose, a spring urging the nose on the locking lever into engagement with said pinion of the film-winding gear, an abutment on one spindle-carried lever urging the locking lever into its inoperative position for a predetermined angular position of the spindle, means urging the other spindle-carried lever in its operative angular position and in locking engagement with the exposure-metering means against movement and a control knob rigidly connected with said spindle, the rotation of said knob in one direction actuating said spindle and levers to disengage said levers from their corresponding locking means.

4. In a photographic camera, the combination of film-winding means, exposure-metering means including a friction wheel engaging the film, a speed-reducing gear controlled thereby and including a friction gear urging the speed-reducing gear against a resistance in operative position, an indicator wheel controlled by the speed-reducing gear carrying the successive numbers of the picture areas to make said numbers appear to view for the successive view-taking positions of the film in the camera, a disc rigid with said indicator wheel provided with a plurality of radial peripheral notches corresponding to the numbers on the indicator wheel, a rotatable spindle, levers rigidly carried at both ends of said spindle, one of said levers engaging selectively the said notches as they pass in front of said lever, locking means for the film-winding means controlled by the other lever each time the first lever operatively engages one of said notches, and an outer control knob rigidly connected with said spindle, the rotation of said knob in one direction actuating said spindle and levers to bring said levers in their disengaged position with respect to said locking means.

5. In a photographic camera, the combination of film-winding means including a film-winding crank, a film-winding gear controlled by said crank and including a pinion, exposure-metering means including a friction wheel engaging the film, a speed-reducing gear controlled thereby, an indicator wheel controlled by the speed-reducing gear carrying the successive numbers of the picture area to make said numbers appear to view for the successive view-taking positions of the film in the camera, a disc rigid with said indicator wheel provided with a plurality of radial peripheral notches corresponding to the numbers on the indicator wheel, a spindle, levers rigidly carried at both ends of said spindle, one of said levers engaging selectively the notches in the disc of the metering means, as they pass in front of it, a locking lever including a nose, a spring urging the nose on the locking lever into engagement with said pinion of the film-winding gear, an abutment on one spindle-carried lever urging the locking lever into its inoperative position for a predetermined angular position of the spindle, means urging the other spindle-carried lever in its operative angular position and in locking engagement with the exposure-metering means against movement and a control knob rigidly connected with said spindle, the rotation of said knob in one direction actuating said spindle and levers to disengage said levers from said disc and said pinion.

6. In a photographic camera, the combination of film-winding means, exposure-metering means including a friction wheel engaging the film, a speed-reducing gear controlled thereby, an indicator wheel controlled by the speed-reducing gear carrying the successive numbers of the picture areas to make said numbers appear to view for the successive view-taking positions of the film in the camera, a disc rigid with said indicator wheel provided with a plurality of radial peripheral notches corresponding to the number on the indicator wheel, a second disc mounted coaxially with the indicator wheel and with the first disc, a spring connecting said second disc with the indicator wheel and disc system to constrain said second disc to follow the rotation of the said system, radial peripheral projections on said second disc coacting with said notches to normally cover the notches in the first disc and to uncover same against the action of the spring acting on said second disc, a rotatable spindle, levers rigidly carried at both ends of said spindle, one of said levers engaging selectively the abutments on the second disc to urge same away from the corresponding notches and to drop into the uncovered notch facing said lever, locking means for the film-winding means controlled by the other lever each time the first lever operatively engages one of the notches in the disc of the metering means and an outer control knob for the spindle, the rotation of said knob actuating said levers into their inoperative positions.

7. In a photographic camera, the combination of film-winding means, exposure-metering means including a friction wheel engaging the film, a speed-reducing gear controlled thereby and including a friction gear urging the speed-reducing gear against a resistance in inoperative position, an indicator wheel controlled by the speed-reducing gear carrying the successive numbers of the picture areas to make said number appear to view for the successive view-taking positions of the film in the camera, a disc rigid with said indicator wheel provided with a plurality of radial peripheral notches corresponding to the numbers on the indicator wheel, the first of said notches having a reduced depth, a spindle, levers rigidly carried at both ends of said spindle, one of said levers engaging selectively the notches in the disc of the metering means, as they pass in front of it, said lever, when engaging the first notch, being held in an intermediary shifted position with reference to that occupied by it when engaging any other notch, locking means for the film-winding means controlled by the other lever each time the first lever operatively engages one of the notches in the disc of the metering means that does not hold it in its intermediary position, and an outer control knob for the spindle, the rotation of said knob and said spindle actuating said levers into their inoperative positions.

8. In a photographic camera, the combination of film-winding means, a crank, a foldable notched disc rigid with the crank, a catch engaging said disc when the crank is in its folded inoperative position, a film-winding gear controlled by said crank and including a pinion, exposure-metering means, a spindle, levers rigidly carried at both ends of said spindle, a locking lever including a nose, a spring urging the nose on the locking lever into engagement with said pinion of the film-winding gear, an abutment on one spindle-carried lever urging the locking lever into its inoperative position for a predetermined angular position of the spindle, means urging the other lever in locking engagement, in its operative angular position, the exposure-metering means against movement and a control knob connected with the spindle for the shifting of the spindle into an angular position for which both levers are inoperative for locking purposes.

9. In a photographic camera, the combination of film-winding means, a plate carrying said film-winding means, exposure-metering means including a friction wheel engaging the film, a speed-reducing gear controlled thereby, an indicator wheel controlled by the speed-reducing gear carrying the successive numbers of the picture areas to make said numbers appear to view for the successive view-taking positions of the film in the camera, a disc rigid with said indicator wheel provided with a plurality of radial peripheral notches corresponding to the numbers on the indicator wheel, a plate to which said friction wheel, speed-reducing gear, indicator wheel and disc are pivotally secured, a spindle, levers rigidly carried at both ends of said spindle, one of said levers engaging selectively the notches in the disc of the metering means, as they pass in front of it, locking means for the film-winding means, carried by the first plate and controlled by the other lever each time the first lever operatively engages one of the notches in the disc of the metering means, and an outer control knob for the spindle actuating the latter into a position for which both levers enter their inoperative positions.

References Cited in the file of this patent

UNITED STATES PATENTS

| Number | Name | Date |
|---|---|---|
| 433,020 | McKellen | July 29, 1890 |
| 2,016,611 | Muller | Oct. 8, 1935 |
| 2,148,636 | Muller et al. | Feb. 28, 1939 |
| 2,548,530 | Harvey | Apr. 10, 1951 |